(12) United States Patent
Chen et al.

(10) Patent No.: US 10,493,766 B2
(45) Date of Patent: Dec. 3, 2019

(54) FLUID LEVEL SENSING WITH PROTECTIVE MEMBER

(71) Applicant: HEWLETT-PACKARD DEVELOPMENT COMPANY, L.P., Houston, TX (US)

(72) Inventors: Chien-Hua Chen, Corvallis, OR (US); Michael W. Cumbie, Corvallis, OR (US); Devin Alexander Mourey, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/092,547

(22) PCT Filed: Apr. 21, 2016

(86) PCT No.: PCT/US2016/028637
§ 371 (c)(1),
(2) Date: Oct. 10, 2018

(87) PCT Pub. No.: WO2017/184146
PCT Pub. Date: Oct. 26, 2017

(65) Prior Publication Data
US 2019/0118540 A1    Apr. 25, 2019

(51) Int. Cl.
*B41J 2/175*    (2006.01)
*G01F 23/24*    (2006.01)
*G01F 23/26*    (2006.01)

(52) U.S. Cl.
CPC ......... *B41J 2/17513* (2013.01); *B41J 2/1753* (2013.01); *B41J 2/17566* (2013.01); *G01F 23/248* (2013.01); *G01F 23/261* (2013.01); *B41J 2002/17579* (2013.01)

(58) Field of Classification Search
CPC .. B41J 2/17513; B41J 2/17566; B41J 2/1753; B41J 2002/17579; G01F 23/261; G01F 23/248; G01F 23/247
See application file for complete search history.

(56) References Cited

U.S. PATENT DOCUMENTS

| 3,905,243 | A | 9/1975 | Goldfuss |
| 4,299,126 | A | 11/1981 | Heuwieser et al. |
| 9,121,746 | B2 | 9/2015 | Knowles et al. |
| 2005/0126282 | A1 | 6/2005 | Maatuk |

(Continued)

FOREIGN PATENT DOCUMENTS

| CN | 202974385 | 6/2013 |
| GB | 2509143 | 6/2014 |
| TW | 201033019 A | 9/2010 |

*Primary Examiner* — Henok D Legesse
(74) *Attorney, Agent, or Firm* — Fabian VanCott

(57) ABSTRACT

A fluid level sensing device includes a substrate (210) and a sensing die (216) cantilevered at one end from the substrate. A number of sensing components (218), preferably thermal or impedance sensing components, are disposed on the sensing die and detect a fluid level in a fluid reservoir. A protective member (208) is also cantilevered at one end from the substrate alongside the sensing die. Electrical interconnects (212) output data collected from the number of sensing components. A number of sensing dies may be provided to lengthen the sensing device, in which case the protective cover extends alongside and parallel to the number of sensing dies.

20 Claims, 9 Drawing Sheets

(56) References Cited

U.S. PATENT DOCUMENTS

| | | | |
|---|---|---|---|
| 2008/0107151 A1* | 5/2008 | Khadkikar | G01F 1/696 374/141 |
| 2011/0221802 A1* | 9/2011 | Sabanovic | B41J 2/17566 347/7 |

\* cited by examiner

FLUID LEVEL SENSING WITH PROTECTIVE MEMBER

BACKGROUND

Fluid reservoirs are used to contain all sorts of fluids. For example in printing systems, print cartridges hold stores of printing fluid such as ink. The ink, or other printing fluid from a reservoir, is supplied to a printhead which deposits the printing fluid onto a print medium, such as paper. As the printing fluid is deposited onto a print medium, the printing fluid is depleted from the fluid reservoir.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
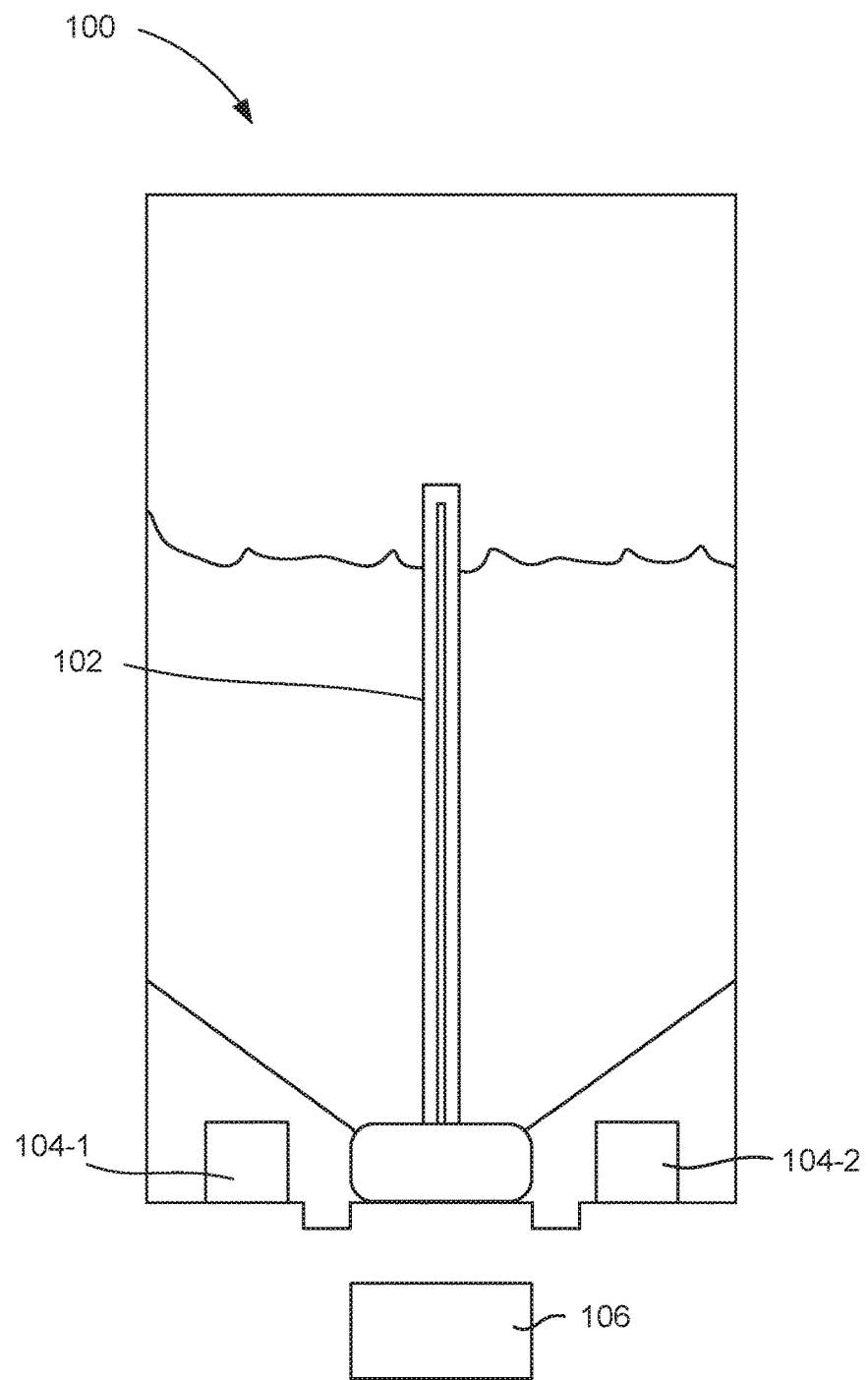
FIG. 1 is a cross-sectional view of a fluid level sensing device with a protective member as inserted into a fluid reservoir, according to one example of the principles described herein.

Fluid reservoirs are used to hold various types of fluids. For example, in a printing system, an ink cartridge stores a volume of ink. This ink is passed to a printhead for ultimate deposition on a print media to form text or images on the print media.

As printing fluid is deposited on a print medium, the fluid reservoir is depleted of printing fluid. Attempting to execute a printing operation when a fluid reservoir is empty can result in damage to the printing device, the printhead, or the reservoir itself. Moreover, print quality can suffer if printing is executed with a reduced amount of fluid in the reservoir. Still further, it may be inconvenient to a consumer if a fluid reservoir runs out and the consumer has not been able to adequately prepare, for example by purchasing additional fluid reservoirs. Such consumer inconvenience can lead to customer dissatisfaction and ultimate loss of profits by a manufacturer of the reservoir.

Accordingly, fluid level sensors can be used to detect the amount of fluid in a fluid reservoir. Such sensors indicate a level of fluid in the fluid reservoir in an attempt to provide helpful, accurate information regarding fluid levels, and in the case of a printing system, can be used to estimate how much printing can be performed given the present level of ink in an ink reservoir.

While such fluid level sensors can be helpful in indicating an amount of fluid, some characteristics reduce the sensors ability to accurately indicate a fluid level. For example, certain sensors enable low-resolution analog fluid level sensing and support less efficient ink level sensing methods.

Accordingly, the present specification describes a fluid level sensing device that affords accurate, high-resolution fluid level measurements. Specifically, the fluid level sensing device implements a narrow sensing die, less than 500 micrometers wide. Disposed on the sensing die are sensing components that detect a fluid level. The fluid level sensing device also includes a protective member to protect the sensing components from mechanical damage during, for example, manufacture, shipping, assembly, and use. The sensing die and protective member are attached and electrically connected to a substrate with electrical interconnects disposed thereon. The narrow sensing die enables large die separation ratios which reduce the cost of manufacture. Still further, the manufacture of such thin and narrow sensing dies is simple and relatively inexpensive thus reducing the overall cost of the fluid level sensing device. Moreover, these sensing dies allow precise control over sensor geometry and support fluid level sensing with multiple detection methods such as thermal fluid level sensing and impedance fluid level sensing. The protective member can be a stamped member, thus further reducing the cost of the fluid level sensing device.

Specifically, the present specification describes a fluid level sensing device. The fluid level sensing device includes a substrate and a sensing die cantilevered at one end from the substrate. A number of sensing components are disposed on the sensing die. The number of sensing components detect a fluid level in a fluid reservoir. The fluid level sensing device also includes a protective member cantilevered at one end from the substrate alongside the sensing die. Electrical interconnects of the fluid level sensing device output data collected from the number of sensing components.

The present specification also describes a method for forming a fluid level sensing device. In the method, a protective member is attached as a cantilever from a substrate. The substrate includes electrical interconnects to output data collected from a number of sensing components. A sensing die is also attached as a cantilever from the substrate such that the sensing die is parallel to, and alongside the protective member. The sensing die has the number of sensing components disposed thereon. An integrated circuit that outputs data collected from the number of sensing components is then attached to the substrate. The number of sensing components are then electrically coupled to the electrical interconnects via the sensing die and the integrated circuit.

In another example, a fluid level sensing device is described that includes a substrate having electrical interconnects disposed thereon. The electrical interconnects output data collected from an integrated circuit. The fluid level sensing device also includes a number of sensing dies, a first sensing die cantilevered at one end from the substrate and a number of sensing components disposed on the number of sensing dies to detect a fluid level in a fluid reservoir. A protective member is cantilevered at one end from the substrate alongside, and parallel to, the number of sensing dies to provide mechanical protection to the number of sensing dies. The protective member 1) is separated from the number of sensing dies and 2) surrounds the number of sensing dies on multiple sides. An integrated circuit of the fluid level sensing device outputs data collected from the number of sensing components to the electrical interconnects. A cover is disposed over a connection between the first sensing die and the substrate and a sealing device seals the fluid level sensing device against a fluid reservoir in which the fluid level sensing device is inserted.

Using such a device for sensing a fluid level 1) provides a low cost, high volume, and simple manufacturing process; 2) protects the small sensing die; 3) provides a high resolution and high performance fluid level sensing platform; 4) supports multiple processes for detecting fluid levels; and 5) results in increased customer satisfaction due to the increased performance. However, it is contemplated that the devices disclosed herein may provide useful in addressing other matters and deficiencies in a number of technical areas. Therefore the systems and methods disclosed herein should not be construed as addressing any of the particular matters.

As used in the present specification and in the appended claims, the term "aspect ratio" refers to a width to length ratio of a component. For example, a sensing die having an aspect ratio of at least 1:100 indicates that the length of the sensing die is at least 100 times greater than the width of the sensing die.

Further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

Turning now to the figures, FIG. 1 is a cross-sectional view of a fluid level sensing device (102) with a protective member as inserted into a fluid reservoir (100), according to one example of the principles described herein. A fluid reservoir (100) may be any container that holds a fluid. For example, a printing system implements a print cartridge, wherein the fluid stored therein is ink. The fluid reservoir (100) retains fluid and supplies it to a system for further operation. For example, in a printing system, via a number of fluid interconnects (104), a printing fluid within the reservoir is supplied to a printhead to be ultimately deposited on a print media. As fluid is used, it is depleted from the fluid reservoir (100). Accordingly, a fluid level sensing device (102) allows for an accurate indication of the fluid level within the fluid reservoir (100). Moreover, the fluid level sensing device (102) of the present specification which includes a protective member, offers increased accuracy and resolution in providing such a measure.

As depicted in FIG. 1, the fluid level sensing device (102) is disposed within the fluid reservoir (100). As will be described below, the fluid level sensing device (102) has electrical interconnects to output data collected from the number of sensing components. These electrical interconnects of the fluid level sensing device (102) mate, and electrically couple, with a corresponding electrical interconnect (106) on a separate component such that data collected from the fluid level sensing device (102) can be passed to a corresponding system and analyzed and used to control operation of the associated system.

Figure 2:
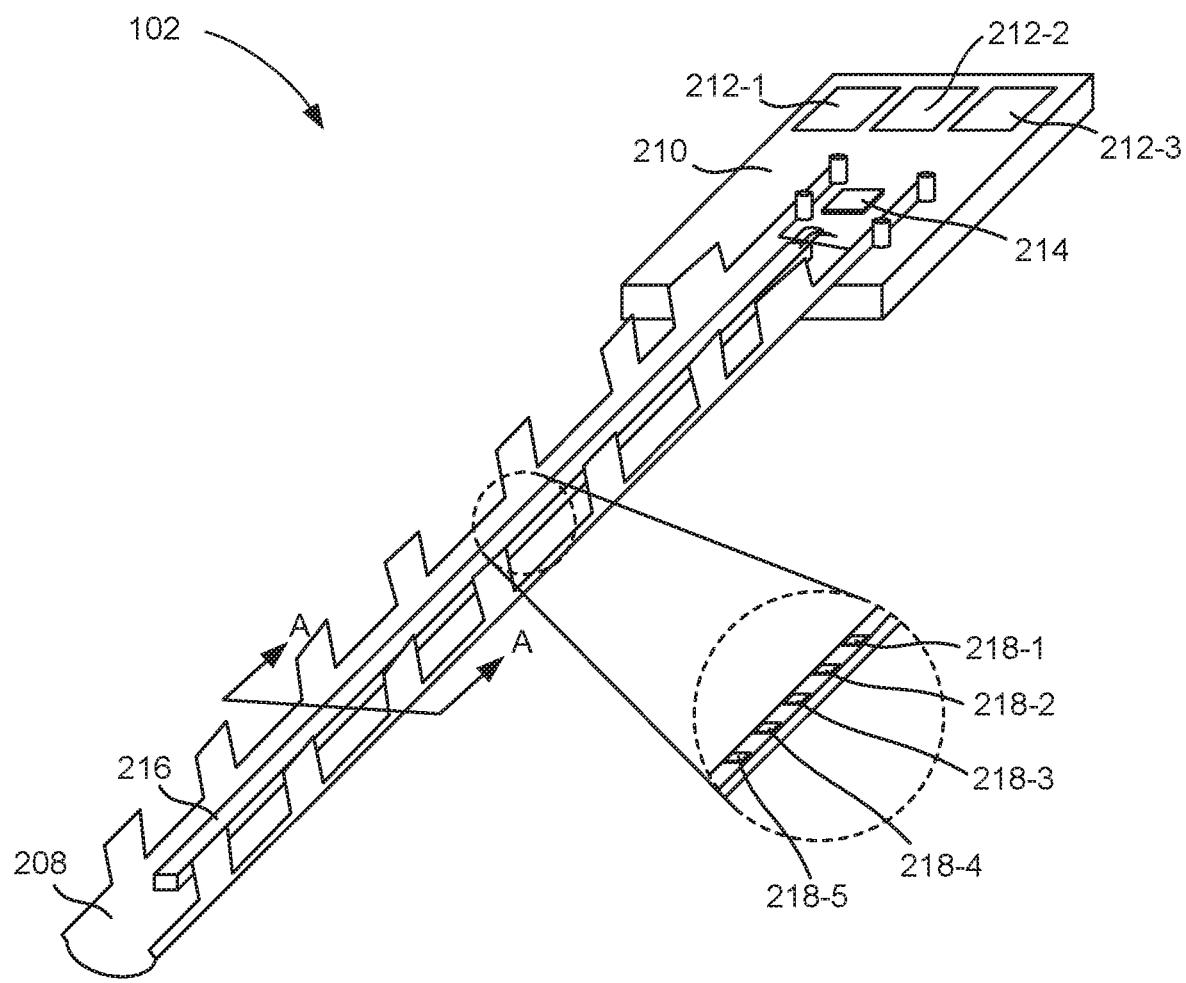
FIG. 2 is an isometric view of the fluid level sensing device with a protective member, according to one example of the principles described herein.

FIG. 2 is an isometric view of the fluid level sensing device (102) with a protective member (208), according to one example of the principles described herein. The fluid level sensing device (102) includes a substrate (210). The substrate (210) is a rigid member that provides mechanical support for the fluid level sensing device (102). The substrate (210) may comprise any number of materials including plastic, silicon, glass polymers, FR4, glass-reinforced epoxy laminate sheet, tub, rod, or printed circuit board, or other rigid member. In one example, the substrate (210) includes a composite material of woven fiberglass cloth with an epoxy resin binder. For example, the substrate (210) may be a printed circuit board having embedded electrical traces and contact pads to facilitate electrical connection between various components mounted on the substrate (210) such as the sensing die (216) and integrated circuit (214).

Disposed on the substrate (210) are electrical interconnects (212-1, 212-2, 212-3) to output data collected from a number of sensing components (218) of the fluid level sensing device (102). For example, the sensing components (218) may indicate a particular level of fluid within the fluid reservoir (FIG. 1, 100).

These sensing components (218) then pass that information to the electrical interconnects (212) to be output to an external device that can use the outputted data. For example, the fluid level information gathered from the sensing components (218) can be passed to the user to indicate to the user when the fluid reservoir (FIG. 1, 100) needs to be refilled or replaced. Still further, the data collected could be used by a printing system to prevent the printing system from depositing ink on a print media when the sensing components (218) indicate that the fluid level in the fluid reservoir (FIG. 1, 100) is below a threshold level.

In some examples, the fluid level sensing device (102) includes an integrated circuit (214) that includes additional processing functionalities. For example, the integrated circuit (214) may be an application specific integrated circuit that allows for the determination as to whether the fluid in the fluid reservoir (FIG. 1, 100) is counterfeit. The integrated circuit (214) may also be used to drive the sensing components (218), i.e., to drive the heaters and sensors described below. In this example, the information collected from the number of sensing components (218) is first passed to this integrated circuit (214) and then onto the electrical interconnects (212).

The fluid level sensing device (102) includes a sensing die (216). The sensing die (216) is a component of the fluid level sensing device (102) that has disposed thereon a number of sensing components (218). In some examples, the sensing die (216) is a sliver die that is thin, for example, less than 500 micrometers wide and can be narrower for example 220 micrometers wide. The dimensions of the sensing die (216) may relate to one another using an aspect ratio, the aspect ratio being the ratio of the width of the sensing die (216) to the length of the sensing die (216). The sensing die (216) of the present application may have an aspect ratio of at least 1:50. As a further example, the aspect ratio may be 1:100. In other words, the width of the sensing die (216) may be two orders of magnitude smaller than the length. As a specific numeric example, the sensing die may be less than 220 micrometers wide and longer than 22 millimeters.

As described above, the sensing die (102) includes a number of sensing components (218). For simplicity, in FIG. 2, a few sensing components (218-1, 218-2, 218-3, 218-4, 218-5) are depicted, but the sensing components (218) may extend along a length of the sensing die (216). Note that the sensing components (218) as depicted in at least FIG. 2 are not to scale and are enlarged to show their presence on the sensing die (216). Different types of sensing components (218) use different sensing methods to detect the level of fluid in the fluid reservoir. For example, impedance sensing components (218) detect the capacitance of a fluid with which the sensing component (218) is covered. As fluid conducts electricity at a different rate then air, the conductivity between sensing components (218) can be used to determine whether the conducting medium is air or liquid.

In another example, the sensing components (218) may use thermal operations to detect a fluid level. Examples of sensing components (218) used in a thermal fluid level sensing operation are described below in connection with FIG. 4. The sensing die (216) may be a high resolution sensing die (216) meaning the sensing die has a high density of sensing components (218). For example, the sensing die (216) may include over 80 sensors (FIG. 2, 218) per inch of length of the sensing die (216).

Using such a thin sensing die (216) in at least some instances allows for enhanced silicon die separation ratios, reduce, or even minimize, the fan-out chiclets, and avoids many process integration issues. Moreover, the sliver sensing die (216) offers precise control over the sensing die (216) geometry and supports fluid level sensing with multiple detection methods such as thermal fluid level sensing and impedance fluid level sensing.

The sensing die (216) may be cantilevered at one end from the substrate (210). In other words, the sensing die (216) is supported just at one end via the substrate (210). In such a cantilevered fashion, the sensing die (216) has multiple sides exposed to the fluid in the fluid reservoir (FIG. 1, 100), thus increasing the sensitivity of the fluid level sensing device (102).

The fluid level sensing device (102) also includes a protective member (208) that runs alongside the sensing die (216). Like the sensing die (216), the protective member (208) is cantilevered at one end from the substrate (210). The protective member (208) provides mechanical protection of the sensing die (216). For example, during manufacture and shipping, the sensing die (216) may be subject to external forces. These same forces may be exhibited during assembly of the fluid reservoir (FIG. 1, 100), insertion into an external system, and even during use. The protective member (208) may protect against such forces. Accordingly, the protective member (208) may be a rigid component. For example, the protective member (208) may be formed out of metals or alloys such as nickel, copper, a copper iron alloy, a copper zirconium alloy, and stainless steel among other metal and metal alloys.

In some examples, the surface of the protective member (208) may be treated. Examples of such surface finishes include copper, gold, electroless nickel immersion gold, silver, silver-nickel, and copper organic solderability preservative (Cu OSP), among other finishes. The protective member (208) may be fabricated in any number of fashions including stamping, photographic etching, electrical discharge machining, and laser cutting, among other manufacturing methods. The protective member (208) may be between 0.5 millimeters and 40 millimeters thick.

As indicated in FIG. 2, the protective member (208) may run parallel to the sensing die (216) and extend at least a length of the sensing die (216) so as to protect the entire length of the sensing die (216). The protective member (208) may surround the sensing die (216) on multiple sides. For example, as depicted in FIG. 2, the protective member (208) includes a number of fingers that extend up from a base of the protective member (208) to surround sides of the sensing die (216). While FIG. 2 depicts the protective member (208) surrounding the sensing die (216) on three sides, the protective member (208) may surround the sensing die (216) on less than or more than three sides. For example, the protective member (208) may be enclosed, thus surrounding the sensing die (216) on four sides of the sensing die (216). In another example, the protective member (208) may align with one side of the sensing die (216).

The protective member (208) as described herein aids in the protection of the sensing die (216) and corresponding sensing components (218) during manufacture, shipping, assembly, and use. Moreover, as the protective member (208) can be manufactured using cost-effective and simple manufacturing processes, a cheap, efficient form of protecting the sensing components (218) of the sensing die (216) allow for enhanced robustness, and therefore performance, of the fluid level sensing device (102).

Moreover, the thin sliver sensing die (216) provides enhanced sensing resolution based on the fact that the sensing die (216) can accommodate enhanced methods of fluid level detection such as thermal sensing.

Figure 3:
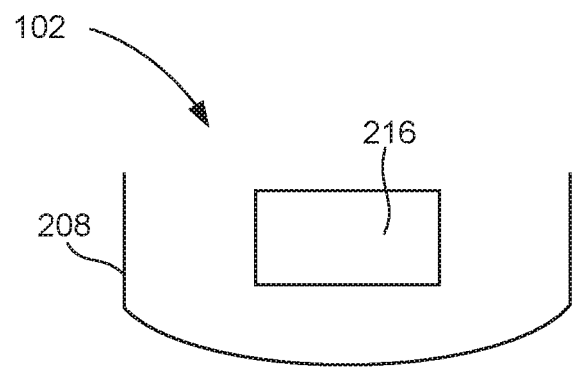
FIG. 3 is a cross-sectional view of the fluid level sensing device with a protective member, according to one example of the principles described herein.

FIG. 3 is a cross-sectional view of the fluid level sensing device (102) with a protective member (208), according to one example of the principles described herein. Specifically, FIG. 3 is a cross-sectional view of the fluid level sensing device (102), taken along the line "A-A" from FIG. 2. As can be seen in FIG. 3, in some examples the protective member (208) is spaced apart from the sensing die (216). That is, contact between the sensing die (216) and the protective member (208) is reserved to the area encompassed by the substrate (FIG. 2, 210). In other words, the sensing die (216) and the corresponding sensing components (FIG. 2, 218) are surrounded on all sides by the fluid in the fluid reservoir (FIG. 1, 100).

Having the protective member (208) separated from the sensing die (216) allows for increased sensitivity of the fluid level sensing device (102). For example, in such a system sensing components (FIG. 2, 218) may be placed on both sides of the sensing die (216). Moreover, as the sliver sensing die (216) is free standing, there may be much less thermal mass than if the sensing die (216) is coupled to a supporting substrate, thus improving the efficiency of the fluid level sensing device (102).

Figure 4:
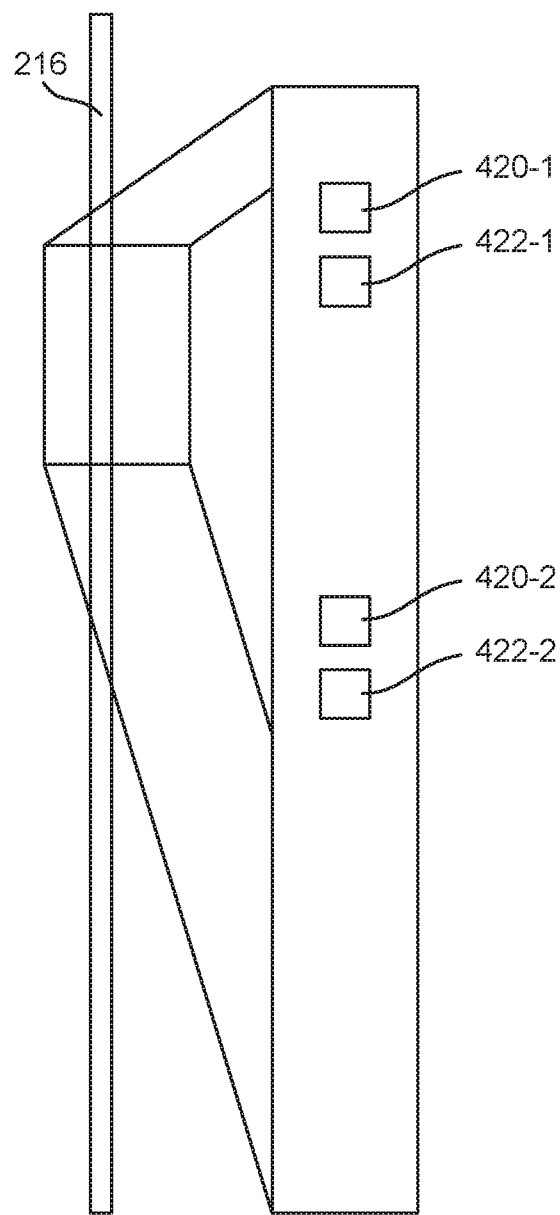
FIG. 4 is a zoomed in view of a portion of the sensing die, according to one example of the principles described herein.

FIG. 4 is a zoomed in view of a portion of the sensing die (216), according to one example of the principles described herein. As described above, the sensing die (216) includes a number of sensing components (FIG. 2, 218). Different types of sensing components (FIG. 2, 218) use different sensing methods to detect the level of fluid in the fluid reservoir. For example, impedance sensing components detect the capacitance of a fluid in which the sensing component is disposed. As fluid conducts electricity at a different rate then air, the conductivity between sensing components can be used to determine whether the conducting medium is air or liquid.

In another example, the sensing components (FIG. 2, 218) may use thermal operations to detect a fluid level. For example, some of the sensing components are heaters (420) and some of the sensing components are heat sensors (422).

The heaters (420) are heating elements spaced along the sensing die (216). Each heater (420) is close enough to a corresponding heat sensor (422) such that heat emitted by an individual heater (420) can be sensed by an associated heat sensor (422). In one example, a heater (420) is an electrical resistor that is turned on and off via electrical circuitry such as a transistor.

Heat sensors (422) are sensing elements that are also spaced along the length of the sensing die (216). Each of the heat sensors (422) are sufficiently close to a corresponding heater (420) such that the heat sensor (422) detects or responds to the transfer of heat from a corresponding heater (420). The heat sensors (422) output a signal which indicates the amount of heat transmitted to the particular heat sensor (422) following and corresponding to a pulse of heat form an associated heater (420). The amount of heat transmitted, and sensed, by a heat sensor (422) will vary depending upon the medium through which the heat was transmitted prior to reaching the sensor (422).

For example, fluid has a higher heat capacity than air. If the level of fluid within the fluid reservoir (FIG. 1, 100) is such that fluid is extending between a particular heater (420) and its associated heat sensor (422), heat transfer from the particular heater (420) and its associated heat sensor (422) will be reduced and slower as compared to circumstances where air is extending between the particular heater (420) and its associated heat sensor (422). Using this determination and the known location of the heater (420) and its corresponding heat sensor (422) along the sensing die (216) the level of fluid within the fluid reservoir (FIG. 1, 100) can be determined.

As indicated in FIG. 4, the heaters (420) and heat sensors (422) may be paired together, having a difference in spacing between them. For example, a first heater (420-1) may be paired with a first heat sensor (422-1), i.e., heat emanated from the first heater (420-1) is sensed by the first heat sensor (422-1). Similarly, a second heater (420-2) may be paired with a second heat sensor (422-2), i.e., heat emanated from the second heater (420-2) is sensed by the second heat sensor (422-2). Separate pairs of heaters (420) and heat sensors (422) are spaced apart from adjacent pairs.

Figure 5:
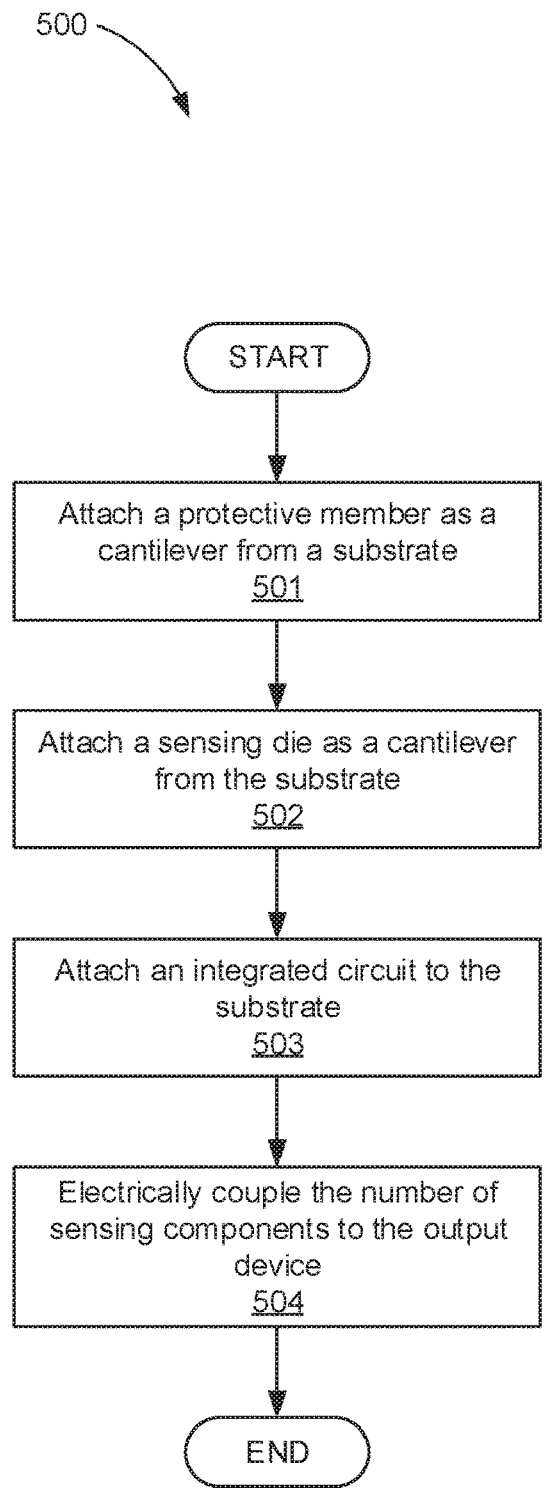
FIG. 5 is a flowchart illustrating a method of forming a fluid level sensing device with a protective member, according to one example of the principles described herein.

FIG. 5 is a flowchart illustrating a method (500) for forming a fluid level sensing device (FIG. 1, 102) with a protective member (FIG. 2, 208), according to one example of the principles described herein. According to the method, a protective member (FIG. 2, 208) is attached (block 501) as a cantilever to the substrate (FIG. 2, 210). The substrate (FIG. 2, 210) includes electrical interconnects (FIG. 2, 212), for example bond pads that interface with an external device to output data collected from a number of sensing components (FIG. 2, 218). The protective member (FIG. 2, 208) can be attached in any number of fashions. For example, the protective member (FIG. 2, 208) could be surface mounted to the substrate (FIG. 2, 210). In another example, the substrate (FIG. 2, 210) includes holes through which pins of the protective member (FIG. 2, 208) protrude to secure the protective member (FIG. 2, 208) to the substrate (FIG. 2, 210).

As described above, attaching the protective member (FIG. 2, 208) provides protection against mechanical damage to the sensing die (FIG. 2, 206). Providing the protective member (FIG. 2, 208) separated from the sensing die (FIG. 2, 216) provides enhanced fluid level sensing due to the fact that all sides of the sensing die (FIG. 2, 216) are exposed to the corresponding fluid in the fluid reservoir (FIG. 1, 100).

A sensing die (FIG. 2, 216) having a number of sensing components (FIG. 2, 218) disposed thereon, is also attached (block 502) as a cantilever from the substrate (FIG. 2, 210). As a cantilever, multiple sides of the sensing die (FIG. 2, 216) are available to receive sensing components (FIG. 2, 218) and accordingly there is increased fluid level sensitivity. Moreover, by not being coupled to a larger body, there is less thermal mass to the sensing die (FIG. 2, 216) such that greater thermal conductance is provided by a sensing die (FIG. 2, 216) that is floating and separated from the protective member (FIG. 2, 208).

The sensing die (FIG. 2, 216) is attached (block 502) to the substrate (FIG. 2, 210) in any number of fashions. For example, an adhesive may be stamped onto the substrate (FIG. 2, 210) and the sensing die (FIG. 2, 216) is disposed thereon. Mile specific reference is made to a stamp adhesive, other methods may be used as well.

The integrated circuit (FIG. 2, 214) is also attached to the substrate (FIG. 2, 210). As described above the integrated circuit (FIG. 2, 214) can control the operation of the sensing components (FIG. 2, 218), and can also relay information from the sensing components (FIG. 2, 218) to the electrical interconnects (FIG. 2, 212). Similar to the sensing die (FIG. 2, 216), the integrated circuit (FIG. 2, 214) is attached (block 503) to the substrate (FIG. 2, 210) in any number of fashions, including using an adhesive stamp. In these examples, after the components are attached, the adhesive is cured so as to permanently affix the sensing die (FIG. 2, 216) and the integrated circuit (FIG. 2, 214) to the substrate (FIG. 2, 210).

According to the method (500), the sensing components (FIG. 2, 218) and electrical interconnects (FIG. 2, 212) are coupled together via the sensing die (FIG. 2, 216) and the integrated circuit (FIG. 214) such that signals can be interchanged between these components. For example, the sensing die (FIG. 2, 216) can be plasma cleaned and wire-bonded to the electrical interconnects (FIG. 2, 212). In another example described below in FIG. 9, multiple sensing dies (FIG. 2, 216) can be joined and wire bonds may be formed from one sensing die (FIG. 2, 216) to an adjacent sensing die (FIG. 1, 102) to extend the length of the fluid level sensing device (FIG. 1, 102).

Figure 6:
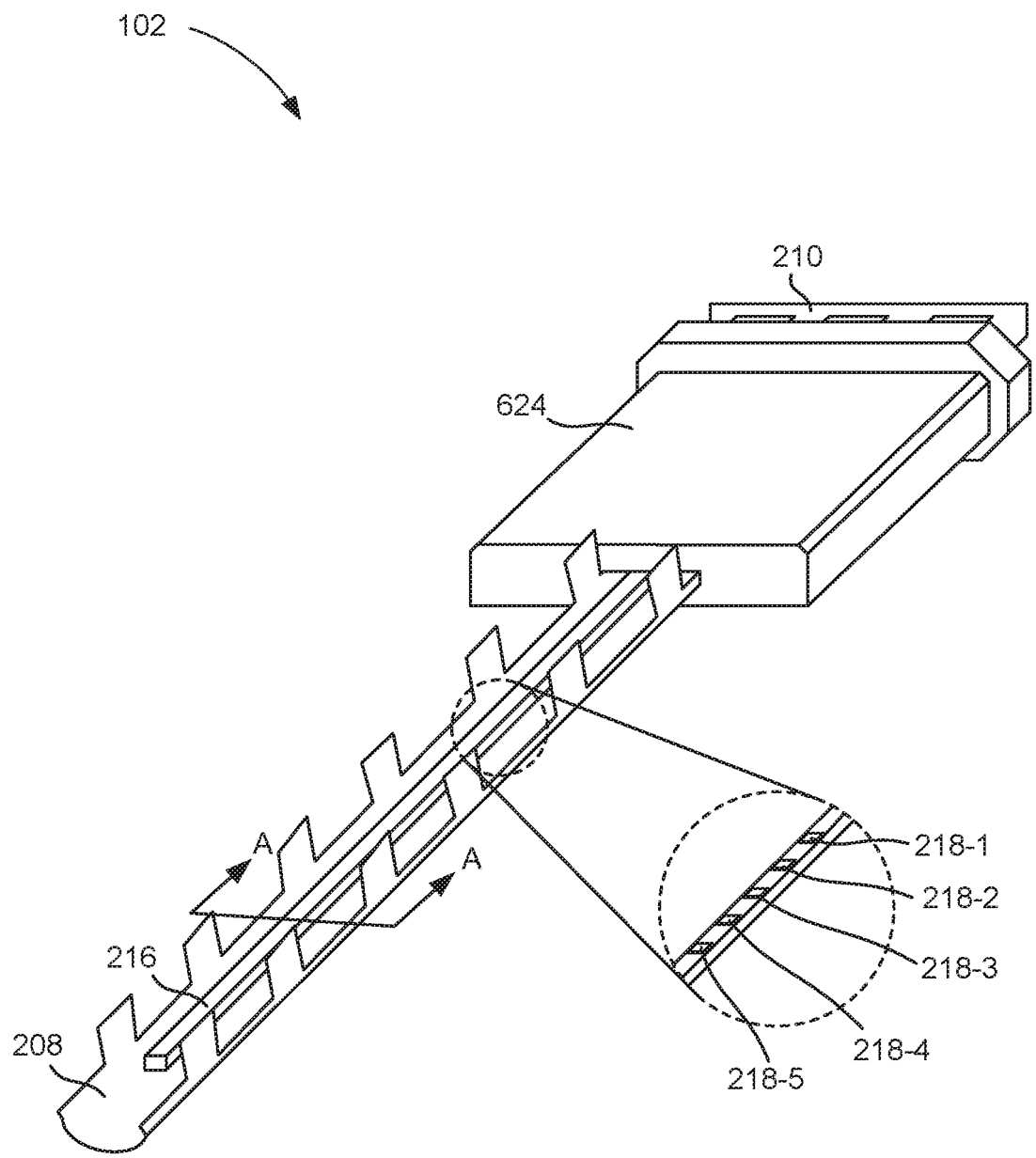
FIG. 6 is an isometric view of a fluid level sensing device with a protective member, according to one example of the principles described herein.

FIG. 6 is an isometric view of a fluid level sensing device (102) with a protective member (208), according to one example of the principles described herein. In some examples, the fluid level sensing device (102) includes a sealing device (624). The sealing device (624) extends around the substrate (FIG. 2, 210) and covers components of the fluid level sensing device (102). For example, the sealing device (624) extends around the connection between the sensing die (216) and the integrated circuit (FIG. 2, 214). This sealing device (624) seals the fluid level sensing device (102) against a fluid reservoir (FIG. 1, 100) in which the fluid level sensing device (102) is inserted. In other words, the sealing device (624) provides a fluidic seal separating fluid contained within the fluid reservoir (FIG. 1, 100) from the electrical connection between the fluid level sensing device (102) and an external system.

Figure 7:
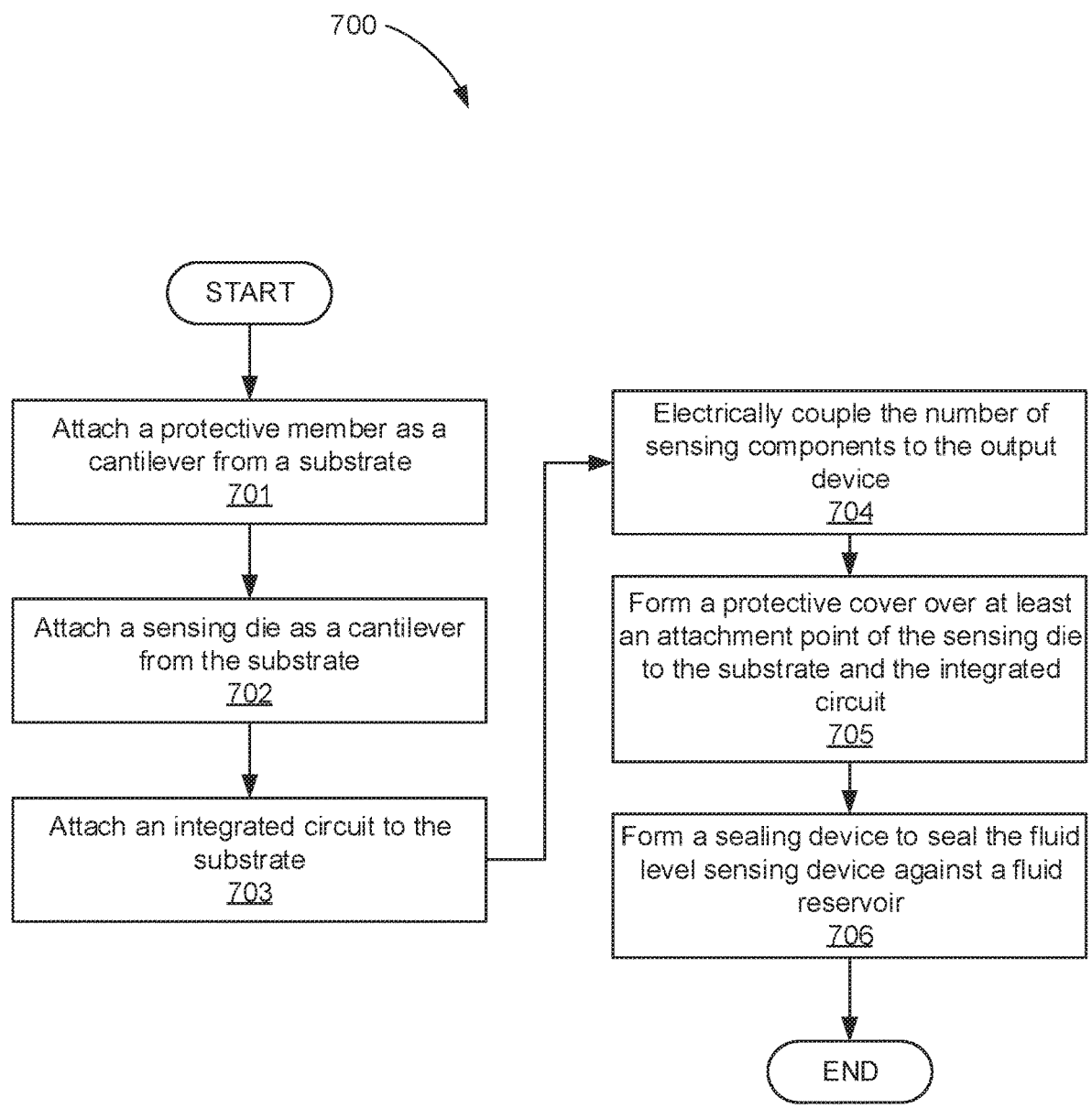
FIG. 7 is a flowchart illustrating a method of forming a fluid level sensing device with a protective member, according to another example of the principles described herein.

FIG. 7 is a flowchart illustrating a method (700) of forming a fluid level sensing device (FIG. 1, 102) with a protective member (FIG. 2, 208), according to another example of the principles described herein. According to the method (700), a protective member (FIG. 2, 208) is attached (block 701) as a cantilever from a substrate (FIG. 2, 210). A sensing die (FIG. 2, 216) is also attached (block 702) as a cantilever from the substrate (FIG. 2, 210). An integrated circuit (FIG. 2, 214) is attached (block 703) to the substrate (FIG. 2, 210) and the number of sensing components (FIG. 2, 218) are electrically coupled (block 704) to the electrical interconnects (FIG. 2, 212). These operations may be performed as described above in connection with FIG. 5.

A protective cover is then formed (block 705) over at least an attachment point of the sensing die (FIG. 2, 216) and the substrate (FIG. 2, 210). The electrical connection between the sensing die (FIG. 2, 216) and the substrate (FIG. 2, 210) may be a number of small electrical wires. Such small wires are susceptible to mechanical damage during manufacture, shipping, assembly, and use. Accordingly, a cover such as a wire bond adhesive or epoxy mold compound encapsulant can be disposed over this area to protect such components, while not interfering with electrical conduction along the lines disposed therein. In some examples, the protective cover may extend over additional components such as the integrated circuit (FIG. 2, 214) and portions of the electrical interconnects (FIG. 2, 212).

A sealing device (FIG. 6, 624) is then formed to seal the fluid level sensing device (FIG. 1, 102) against a fluid reservoir (FIG. 1, 100) in which it is inserted. The sealing device (FIG. 6, 624) may be an overmolded plastic component. The sealing device (FIG. 6, 624) may cover the interface between the sensing die (FIG. 2, 216) and the substrate (FIG. 2, 210) and may also cover the integrated circuit (FIG. 2, 214) and the interface between the protective member (FIG. 2, 208) and the substrate (FIG. 2, 210). The encapsulant cover and sealing device (FIG. 6, 624) serve to protect against mechanical damage to various components of the fluid level sensing device (FIG. 1, 102), specifically those disposed on the substrate (FIG. 2, 210) and also to fluidically seal the fluid in the fluid reservoir (FIG. 1, 100) so as to prevent leakage of fluid from the fluid reservoir. (FIG. 1, 100).

Figure 8A:
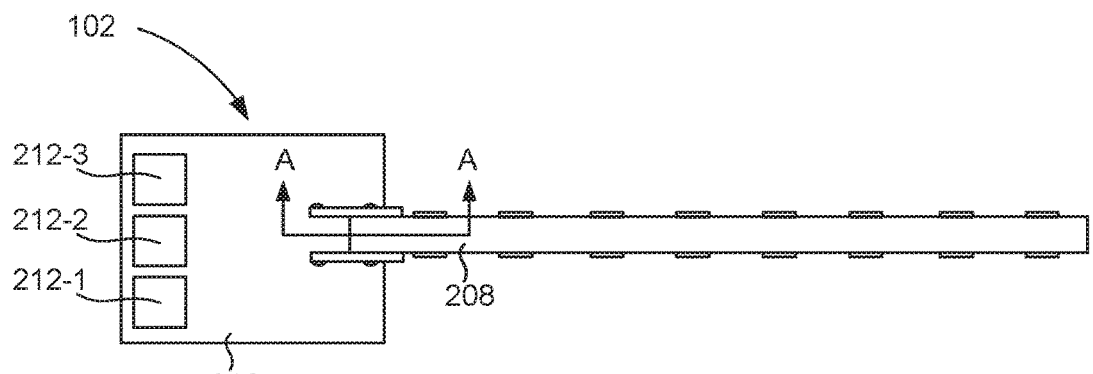
FIGS. 8A-8G are figures illustrating a method of forming a fluid level sensing device with a protective member, according to another example of the principles described herein.
Figure 8B:
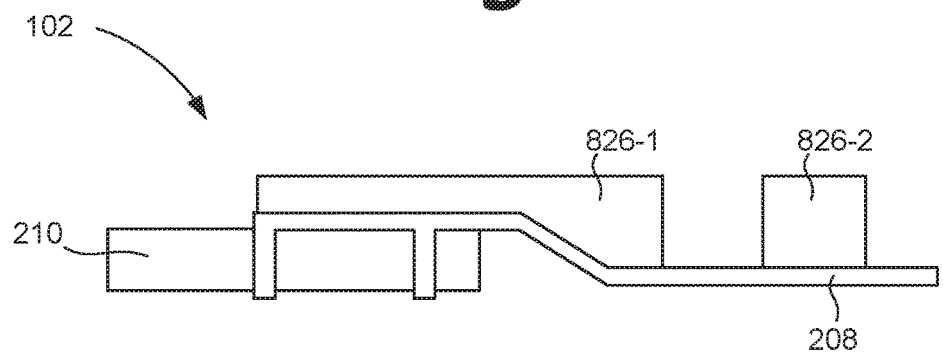

FIGS. 8A-8G are figures illustrating a method of forming a fluid level sensing device (102) with a protective member (208), according to another example of the principles described herein. As depicted in FIG. 8A, the protective member (208) is coupled to the substrate (210), which substrate includes electrical interconnects (212-1, 212-2, 212-3) in the form of multiple electrical bond pads. FIG. 8B is a cross sectional view of the fluid level sensing device (102) taken along the line "A-A" from FIG. 8A. As depicted in FIG. 8B, the protective member (208) may include pins that protrude through holes in the substrate (210) to couple the protective member (208) to the substrate (210). A surface mount may also be possible. FIG. 8B also depicts a number of protective sidewalls (826-1, 826-2) rising from a base of the protective member (208). As noted above, in some examples, the protective member (208) surrounds the sensing die (216) on multiple sides, these protective sidewalls (826) are one mechanism to facilitate this multi-side protection. FIG. 8B also clearly depicts the attachment of the protective member (208) as a cantilever from the substrate (210).

Figure 8C:
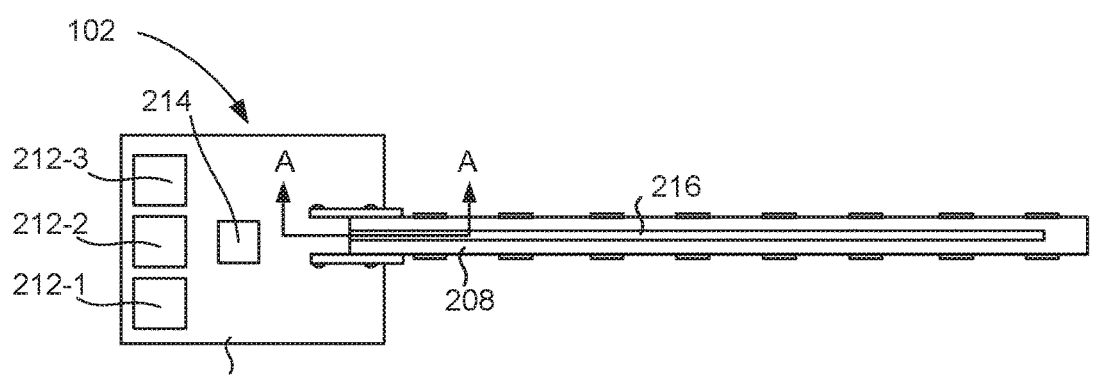
Figure 8D:
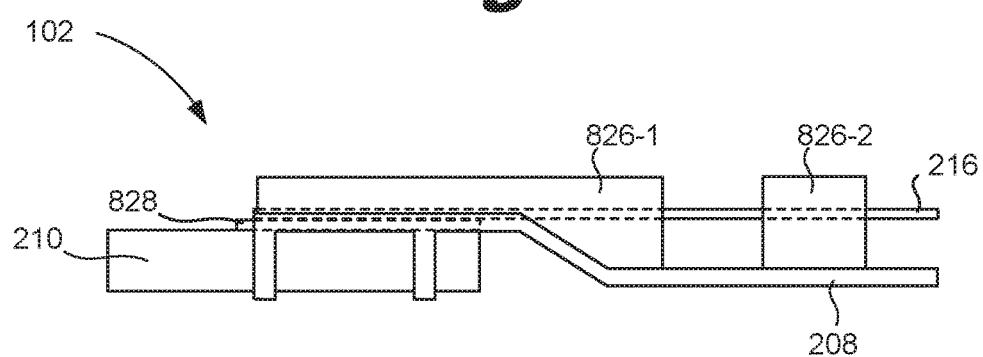

FIGS. 8C and 8D depict the attachment of the sensing die (216) to the substrate (210); FIG. 8D being a cross-sectional view taken along the line "A-A" in FIG. 8C. According to one example, the sensing die (216) may be attached via an adhesive (828). For example, the adhesive (828) is stamped onto the substrate (210) and the sensing die (216) can then be placed on top of the stamp adhesive (828) for precise location and alignment of the sensing die (216). FIG. 8D also clearly depicts the attachment of the sensing die (216) as a cantilever from the substrate (210), and separated from the protective member (208).

FIGS. 8C and 8D also depict the attachment of the integrated circuit (214). Like the sensing die (216), the integrated circuit (214) can be attached via a stamp adhesive placed underneath the integrated circuit (214). In this example, after placement of the adhesives, and of the sensing die (216) and integrated circuit (214), the adhesive may be cured to provide for permanent attachment of the sensing die (216) and the integrated circuit (214) to the substrate (210).

Figure 8E:
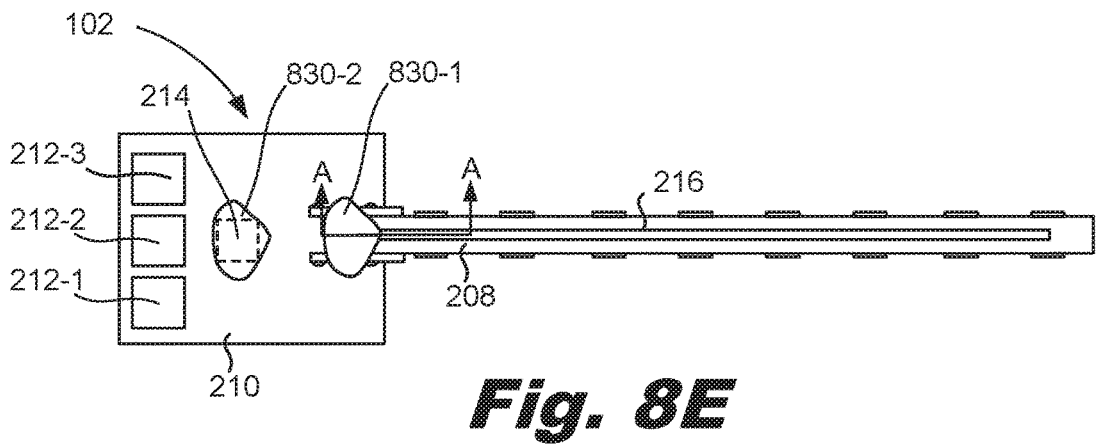
Figure 8F:
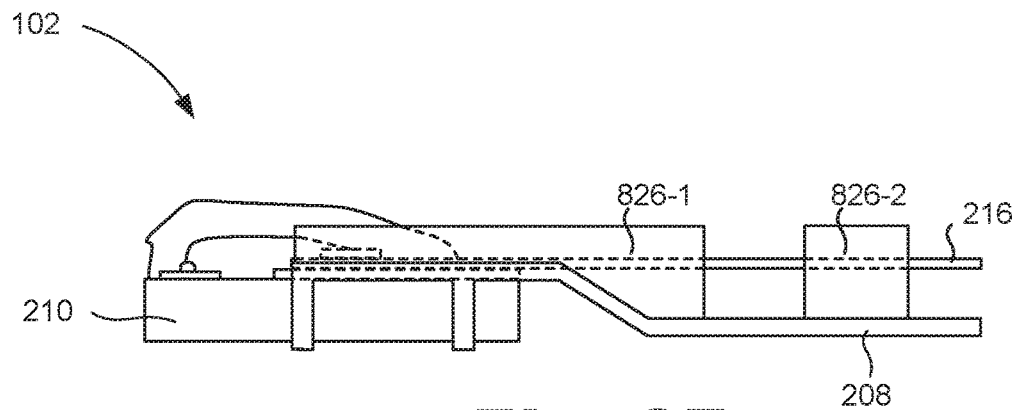

FIGS. 8E and 8F depict the attachment of a cover (830-1) disposed over a connection between the sensing die (216) and the sensing die (216); FIG. 8F being a cross-sectional view taken along the line "A-A" in FIG. 8E. Specifically, the sensing die (216) may be wire bonded to the substrate (210) the wire bond is then encapsulated with the cover (830-1), which cover material may then be cured. As described above, in some examples, the integrated circuit (214) may also be covered by an encapsulant cover (830-2). While FIGS. 8E and 8F depict separate covers (830) extending 1) over a portion of the sensing die (216) and the substrate (210) and 2) over the integrated circuit (214), any number of cover (830) orientations may be used. For example, a single, or multiple covers (830) may encompass portions of the sensing die (216), the substrate (210), the protective cover (208), the integrated circuit (214), and the electrical interconnects (212). The cover (830) provides protection against mechanical damage to the associated components.

Figure 8G:
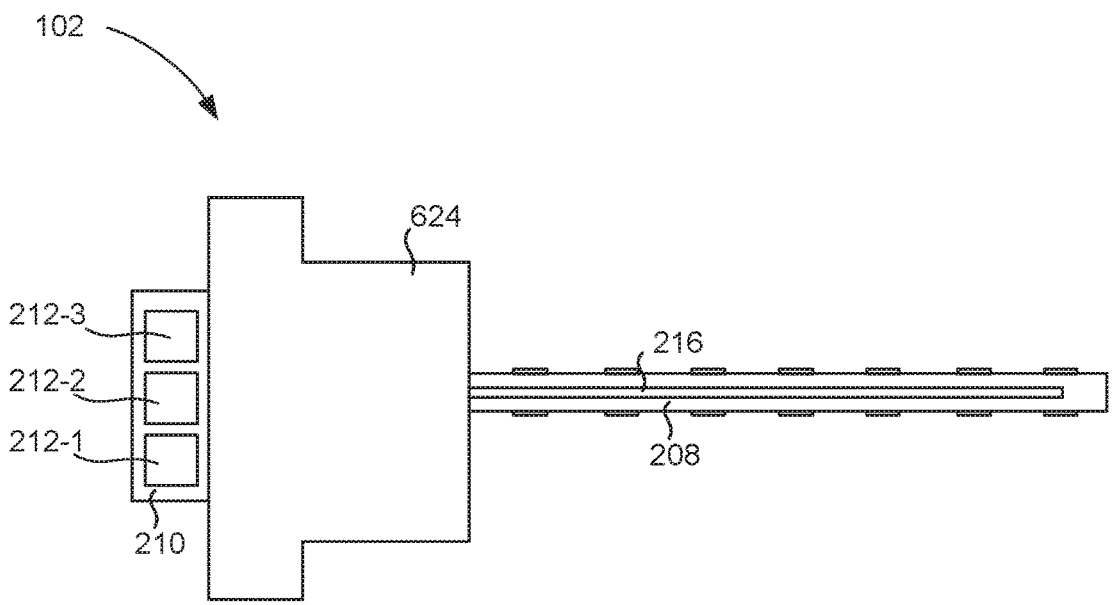

FIG. 8G depicts the addition of the sealing device (624) disposed over various components to provide further protection, as well as to provide a fluidic seal as the fluid level sensing device (102) is disposed within a fluid reservoir (FIG. 1, 100). In one example, the sealing device (624) is adhesively bonded to the substrate (210) by an adhesive that is subsequently cured. In another example, the sealing device (624) can be plastic that is overmolded around the substrate (210) and corresponding components.

Figure 9:
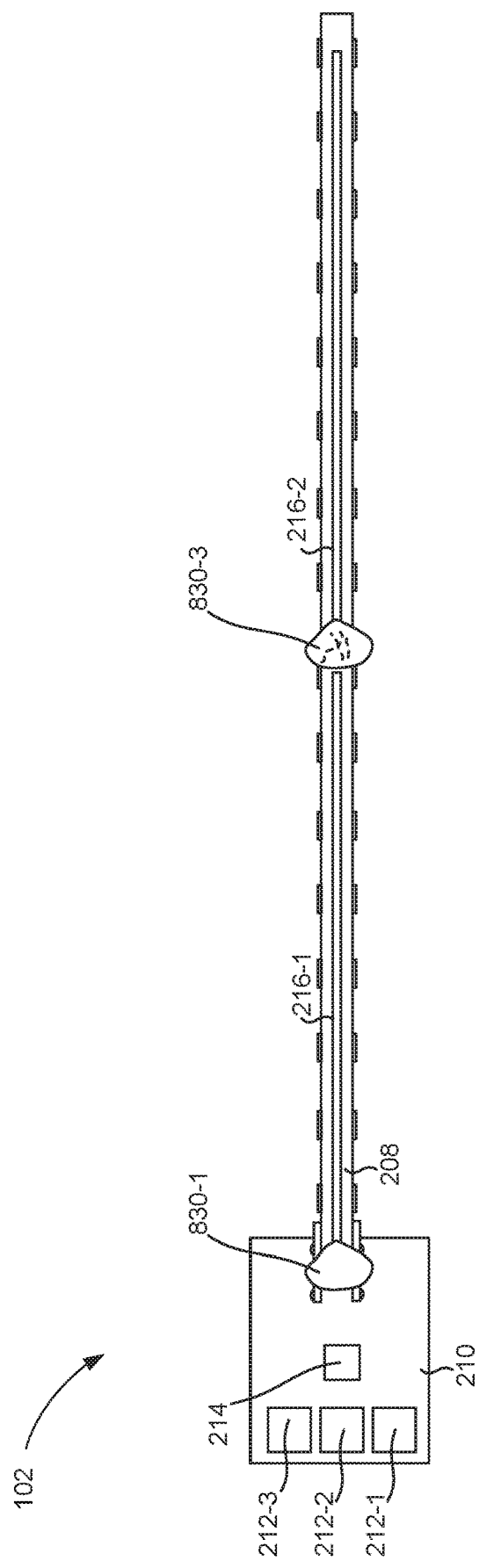
FIG. 9 is a top view of a fluid level sensing device with multiple sensing dies, according to one example of the principles described herein.

FIG. 9 is a top view of a fluid level sensing device (102) with multiple sensing dies (216-1, 216-2), according to one example of the principles described herein. The fluid level sensing device (102) may include the substrate (210), electrical interconnects (212-1, 212-2, 212-3) and integrated circuit (214) similar to those described above. In this example, the first sensing die (216-1) may include bond pads disposed at an end opposite that attached to the substrate (210). These bond pads enable the sensing device (102) to be lengthened by adding an additional sensing die (216-2) in the case where additional fluid level sensing is desired. While FIG. 9 depicts two sensing dies (216-1, 216-2) any number of sensing dies may be coupled together to be included in fluid reservoirs of any depth.

In this example, wire bonds are formed from the additional sensing die (216-2) to the first sensing die (216-1). This is achieved by serially wire-bonding the sensing dies (216). When the additional sensing die (216-2) furthest from the electrical interconnects (212) is actively sensing a fluid level, its signal is propagated through the first sensing die (216-1) via a common communication bus. Is this way, no additional electrical routing substrate is used. After the wire bond is formed, the junction between the additional sensing die (216-2) is encapsulated with a cover (830-3) to adhere the sensing dies (216-1, 216-2) together as well as to provide a robust connection of the extension.

Using such a device for sensing a fluid level 1) provides a low cost, high volume, and simple manufacturing process; 2) protects the small sensing die; 3) provides a high resolution and high performance fluid level sensing platform; 4) supports multiple processes for detecting fluid levels; and 5) results in increased customer satisfaction due to the increased performance. However, it is contemplated that the devices disclosed herein may provide useful in addressing other matters and deficiencies in a number of technical areas. Therefore the systems and methods disclosed herein should not be construed as addressing any of the particular matters.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluid level sensing device comprising:
   a substrate;
   a sensing die cantilevered at one end from the substrate, wherein the sensing die has a length that is at least 50 times greater than its width;
   a number of sensing components disposed on the sensing die to detect a fluid level in a fluid reservoir;
   a protective member cantilevered at one end from the substrate alongside the sensing die; and
   electrical interconnects to output data collected from the number of sensing components.

2. The device of claim 1, wherein the fluid is ink.

3. The device of claim 1, wherein the protective member is parallel to the sensing die.

4. The device of claim 1, wherein the protective member surrounds the sensing die on multiple sides.

5. The device of claim 1, wherein the protective member is spaced apart from the sensing die.

6. The device of claim 1, wherein the sensing die has an aspect ratio of at least 1:100.

7. The device of claim 1, wherein the protective member extends at least a length of the sensing die.

8. The device of claim 1, wherein the protective member comprises a number of protective fingers extending up from a base of the protective member.

9. The device of claim 1, wherein the protective member is surface mounted to the substrate.

10. The device of claim 1, wherein the protective member comprises a number of pins to be inserted through holes in the substrate to mount the protective member to the substrate.

11. A method for forming a fluid level sensing device, comprising:
    attaching a protective member as a cantilever from a substrate, the substrate comprising electrical interconnects to output data collected from a number of sensing components;
    attaching a sensing die, having a length at least 50 times greater than its width, as a cantilever from the substrate such that the sensing die is parallel to, and alongside the protective member, wherein the sensing die has the number of sensing components disposed thereon;
    attaching an integrated circuit to the substrate, the integrated circuit to output data collected from the number of sensing components; and
    electrically coupling the number of sensing components to the electrical interconnects via the sensing die and the integrated circuit.

12. The method of claim 11, further comprising forming a protective cover over at least an attachment point of the sensing die to the substrate.

13. The method of claim 11, further comprising forming a sealing device to seal the fluid level sensing device against a fluid reservoir in which the sensing device is inserted.

14. A fluid level sensing device comprising:
    a substrate having electrical interconnects disposed thereon, the electrical interconnects to output collected data from an integrated circuit;
    a number of sensing dies, a first sensing die cantilevered at one end from the substrate;
    a number of sensing components disposed on the number of sensing dies to detect a fluid level in a fluid reservoir;
    a protective member cantilevered at one end from the substrate alongside, and parallel to, the number of sensing dies to provide mechanical protection to the number of sensing dies, wherein the protective member:
        is separated from the number of sensing dies;
        comprises a number of protective fingers rising from a base; and
        surrounds the number of sensing dies on multiple sides;
    an integrated circuit to output data collected from the number of sensing components to the electrical interconnects;
    a cover disposed over a connection between the first sensing die and the substrate;
    the electrical connects to output data collected from the integrated circuit; and
    a sealing device to seal the fluid level sensing device against a fluid reservoir in which the sensing device is inserted.

15. The device of claim 14, wherein the sensing device is surrounded on all sides by fluid in the fluid reservoir.

16. The device of claim 14, wherein the number of sensing dies are less than 500 micrometers wide.

17. The device of claim 14, wherein the number of sensing components are thermal sensing components or impedance sensing components.

18. The device of claim 14, wherein the number of sensing dies are serially coupled to one another.

19. The device of claim 14, wherein the protective member comprises a treated surface.

20. The device of claim 14, wherein a sensing component comprises a heater and a paired heat sensor.

* * * * *